United States Patent Office 3,211,953
Patented Oct. 12, 1965

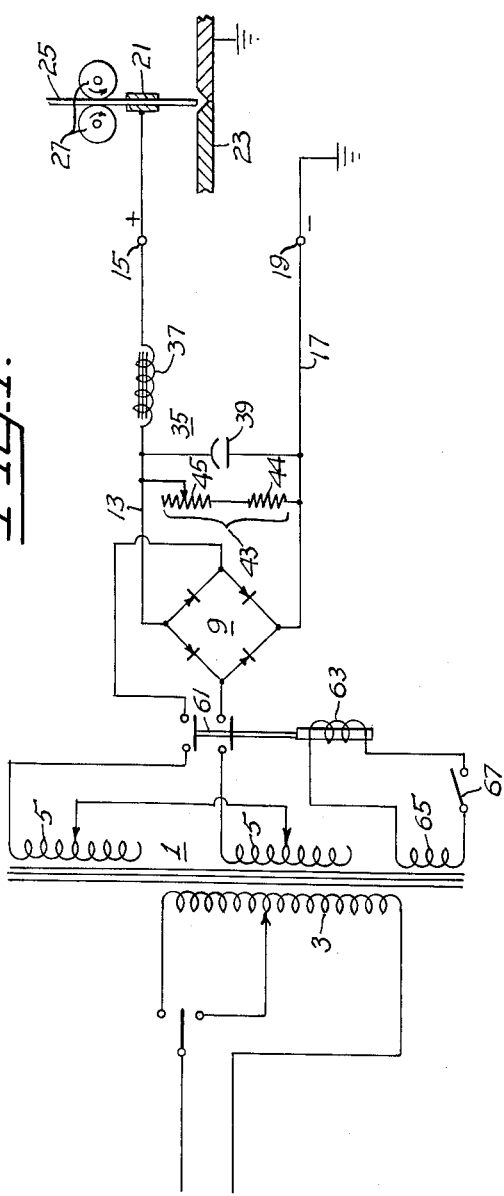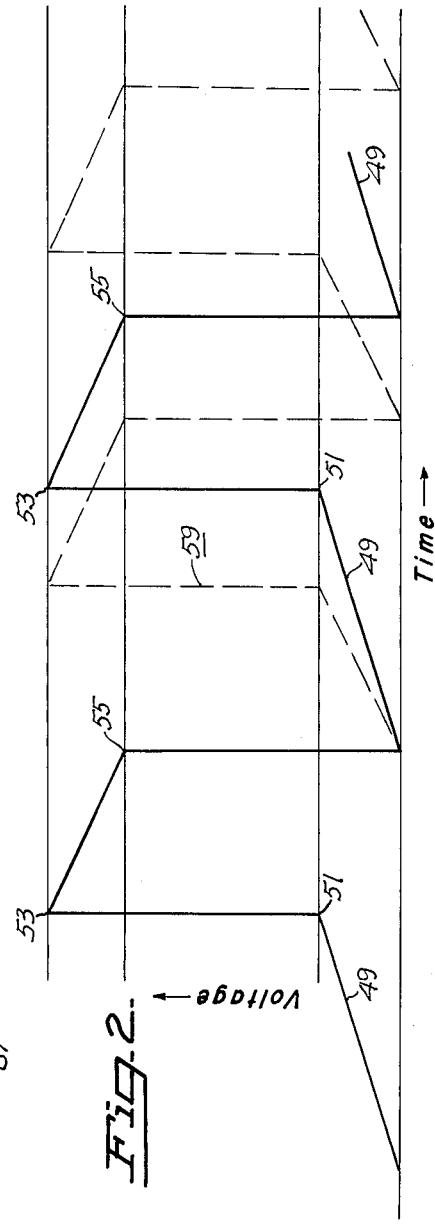

3,211,953
ADJUSTABLE SINGLE PHASE POWER SUPPLY FOR WELDING
William W. Gibson, Alameda, and Frank T. Roach, San Leandro, Calif., assignors to Glenn Pacific Corporation, a corporation of California
Filed May 21, 1962, Ser. No. 196,213
4 Claims. (Cl. 315—200)

Our invention relates to electric welding and more particularly to a power supply, primarily for use in the field of short-arc welding, and constitutes another and different embodiment of the invention disclosed in the application of Glenn and Gibson for High Efficiency Auto-Modulated Welding Arc Power Supply, Serial No. 103,486, now Patent No. 3,136,884, filed April 17, 1961.

This latter application was predicated upon the discovery that by modulating the direct current output of a D.C. voltage power supply, as through the utilization of a tunable tank circuit, improved arc welding characteristics may be obtained, and to the extent that a single phase power supply circuit can be made to weld as good as, and in many instances, produce a better weld than a conventional three phase power supply, though the invention is not limited to such single phase application.

In the short-arc welding process, tuning of the output circuit by the use of combinations of capacitance and variable inductance, makes possible the selection of an optimum droplet rate for the material being welded. Such control is particularly essential in welding very light gauge materials.

As normally applied, and as described in the aforementioned application, the tuning of the tank circuit is accomplished by a continuously variable inductance. The resulting frequency however, is not determined solely by the value of capacitance, and inductance, as in a conventional tunable circuit, but is governed largely by what is happening in the arc gap.

When the equipment, however, is provided with tapped inductance, or one of fixed value, rather than a continuously variable inductance, the tuning suffers from lack of fine vernier adjustment provided by an inductance which may be varied in a continuous manner.

Among the objects of the present invention are:

(1) To provide a novel and improved welding arc power supply adapted for short-arc welding;

(2) To provide a novel and improved welding arc power supply for short-arc welding, wherein a vernier control of the droplet frequency may be obtainable, when the inductance in the power supply circuit is not continuously variable;

(3) To provide a novel and improved short-arc welding power supply circuit wherein a vernier control of the droplet frequency may be obtainable in a very simple and convenient manner;

(4) To provide a novel and improved short-arc welding power supply, wherein the droplet frequency may be continuously varied by adjustment of a variable resistance.

Additional objects of our invention will be brought out in the following description of a preferred embodiment of the same, taken in conjunction with the accompanying drawings, wherein:

FIG. 1 is a circuit diagram depicting a power supply for short-arc welding, utilizing the present invention as applied to a single phase power source; and FIG. 2 is a curve depicting the principle underlying the frequency control of the present invention.

Referring to the drawings for details of our invention in its preferred form, the circuit comprises a source 1 of alternating current voltage which is adjustable to produce alternating voltages within the range of conventional welding voltages of say from seven to fifty volts. Such source of alternating current voltage may include a variable step-down transformer 2 having a primary winding 3 tapped for connection to commercial power sources of different voltages to realize the desired range of welding voltages across a pair of secondary windings 5, which are also tapped to permit of selection of a desired voltage within such range.

The output of the secondary windings is connected across a full wave rectifier 9, preferably one utilizing rectifiers of the semi-conductor type, such as silicon rectifiers, to provide a rectified voltage of comparable value.

The positive side of the full wave rectifier is coupled by a connection 13 to a positive load terminal 15, while the negative side of the rectifier is similarly connected by a connection 17 to a negative load terminal 19, such terminals being provided for connection, one to an electrode 21, the other to the work 23 to be welded, or in other words across a welding arc gap.

The electrode 21 is one through which electrode wire 25 is fed at a constant rate, by and between a pair of feed rolls 27.

In short-arc welding, the electrode wire is generally of very small diameter of the order of .03 inch in diameter, and is fed to the work and at a rate varying from an approximate maximum of ten inches per second down to a rate of the order of .5 inch per second for very light gauge material to be welded. The present invention is particularly applicable to the welding of very light gauge material wherein a very delicate control of the droplet frequency is necessary in order to avoid burning through the thin gauge material being welded.

Between the rectifier and the load terminals, is a tank circuit 35 including a reactor 37 in the connection 13 from the positive side of the rectifier to the positive load terminal, and a large condenser 39 or equivalent bank of condensers, preferably of the electrolytic type, connected from the negative connection 17 to the positive connection, the latter being at a point between the rectifier circuit and the reactor.

The reactor 37 will have a value of the order of 2 millihenries, and may be tapped to provide for intermediate values.

The condenser may have a value within the range from twenty thousand micro-farads to eightly thousand micro-farads. A value which we have found to have been very satisfactory in operating at a welding voltage of the order of fifty volts, is sixty thousand micro-farads.

Shunting the condenser 39, or its equivalent bank of condensers, is a variable resistor 43 preferably made up of a fixed resistance component 44 and an adjustable resistance component 45. The presence of this resistor 43 will alter the charging rate of the condenser from what it would be without the resistor, and by making the resistor variable, the charging rate may be accordingly adjusted.

The droplet frequency is a function of the rate of wire feed to the work and the characteristics of the voltage applied across the arc gap. The rate of rod feed is governed largely by the welding current required to perform the particular welding operation under consideration, and accordingly, does not permit of any wide range of adjustment to vary arc characteristics. Besides, arc characteristics are not very sensitive to changes in the feed rate of the welding wire.

The present system like that of the previously filed application, provides for the feeding of pulses of D.C. voltage to the arc, with means for continuously varying the frequency of such pulses to obtain a droplet frequency most effective for the work to be accomplished.

What happens in the arc gap between the end of the wire and the work is not too clear, but an oscilloscope connected to record the voltage variations across the gap, produces an average curve such as depicted in FIG. 2 of the drawings. This curve does not purport to depict transient phenomena apparently superimposed thereon which does appear on the oscilloscope screen.

Referring to the curve, the lower rising slope portion 49 of each cycle apparently represents the charging curve of the condenser 39, as controlled by the shunting resistance 43, the angle of the slope being indicative of the rate of charge. Apparently, when the voltage across the condenser builds up to a certain value, represented by the point 51, the voltage jumps to maximum value as represented by point 53, practically instantaneously, at the burn off of the electrode.

Following this, the voltage across the arc gap decays somewhat to the point 55, apparently indicative of condenser discharge with the inductance 37 in circuit, and then instantaneously drops down to its lowest value, which apparently represents zero voltage, and then begins to build up again at a rate determined by the charging of the condenser as controlled by the resistance shunting the same.

By altering the resistance, the slope of the charging curve changes, and thus alters the time interval of each cycle, and accordingly changes the frequency of the D.C. voltage pulses across the arc or arc gap. An example of this is depicted by the dash line curve 59. It is to be noted that the frequency discussed, is not the frequency of a conventional tuned alternating current circuit, for in the present case, one is dealing with D.C. pulses. However, the frequency of such pulses is largely determined by the electrical constants of inductance, capacity and resistance together with the action of the arc gap and arc characteristics.

Changing of the charging rate of the condenser may also be accomplished by connecting a variable resistance in series therewith, or even altering the value of the condenser, and such approaches are within the contemplation of the present invention, the common factor being the changing of the charging rate of the condenser.

In employing the power supply described above, for short-arc welding, the power is turned on and the electrode wire fed to the work at a rate determined by the current requirements. Turning on of the power may be accomplished by running the connections to the rectifier 9 through a solenoid operated switch 61 having a coil 63 connected across an auxiliary secondary winding 65 of the transformer 1, through a manually controlled switch 67.

From the foregoing description of our invention in its preferred form, it will be apparent that the same fulfills all the objects of the present invention, and while we have illustrated and described the same in considerable detail, it will be apparent that the invention is subject to alteration and modification without departing from the underlying principles involved, and we accordingly do not desire to be limited in our protection to the specific details illustrated and described, except as may be necessitated by the appended claims.

We claim:

1. A power supply for welding, preferably short-arc welding, comprising
   a source of alternating current at substantially welding voltage,
   means coupled to said source of alternating current for rectifying the output of said source of alternating current,
   a pair of load terminals for electrical connection to an electrode and work to be welded,
   an electrical connection from one side of said rectifier means to one of said load terminals,
   an electrical connection from the other side of said rectifier means to the other of said load terminals,
   both of said electrical connections being capable of carrying current required to produce welding of metal,
   condenser means electrically connected in circuit across said rectifier means,
   an inductance included in one of said connections, between the point of connection of said condenser means thereto and a load terminal,
   means for adjusting the timing of voltage pulses developed between said load terminals when connected to a load, said last means including
   operator adjustable means across said condenser means for altering the charging rate of said condenser means.

2. A power supply for welding, preferably short-arc welding, comprising
   a source of alternating current at substantially welding voltage,
   means coupled to said source of alternating current for rectifying the output of said source of alternating current,
   a pair of load terminals for electrical connection to an electrode and work to be welded,
   an electrical connection from one side of said rectifier means to one of said load terminals,
   an electrical connection from the other side of said rectifier means to the other of said load terminals,
   both of said electrical connections being capable of carrying current required to produce welding of metal,
   condenser means electrically connected in circuit across said rectifier means,
   an inductance included in one of said connections, between the point of connection of said condenser means thereto and a load terminal,
   means for adjusting the timing of voltage pulses developed between said load terminals when connected to a load, said last means including
   means in the form of an operator adjustable resistance shunting said condenser means.

3. A power supply for welding, preferably short-arc welding, comprising
   a source of alternating current at substantially welding voltage,
   means coupled to said source of alternating current for rectifying the output of said source of alternating current,
   a pair of load terminals for electrical connection to an electrode and work to be welded,
   an electrical connection from one side of said rectifier means to one of said load terminals,
   an electrical connection from the other side of said rectifier means to the other of said load terminals,
   both of said electrical connections being capable of continuously carrying current required to produce welding of metal,
   a tank circuit between said rectifier and said load terminals, said tank circuit including,
   an inductance in one of said load terminal connections and condenser means electrically connected in circuit across said rectifier with one side of said condenser means connected between said rectifier and said inductance, and
   means for adjusting the timing of voltage pulses developed between said load terminals when connected to a load, said last means including
   operator adjustable means for altering the charging rate of said condenser means.

4. A power supply for welding, preferably short-arc welding, comprising
   a source of alternating current at substantially welding voltage,
   means coupled to said source of attenuating current for rectifying the output of said source of alternating current,
   a pair of load terminals or electrical connection to an electrode and work to be welded,
   an electrical connection from one side of said rectifier means to one of said load terminals,
   an electrical connection from the other side of said rectifier means to the other of said load terminals, both of said electrical connections being capable of carrying current required to produce welding of metal, a tank circuit electrically connected between said rectifier and said load terminals, said tank circuit including, an inductance in one of said load terminal connections and condenser means electrically connected in circuit across said rectifier with one side of said condenser means connected between said rectifier and said inductance, and means for adjusting the timing of voltage pulses developed between said load terminals when connected to a load, said last means including means in the form of an operator adjustable resistance shunting said condenser means.

References Cited by the Examiner

UNITED STATES PATENTS

| | | | |
|---|---|---|---|
| 2,255,141 | 9/41 | Weir | 315—205 |
| 2,414,363 | 1/47 | Dietert et al. | 315—200 |
| 2,756,316 | 7/56 | Teubner | 315—227.1 |
| 2,785,279 | 3/57 | Williams | 315—227.1 |
| 3,025,388 | 3/62 | Turbitt | 219—131 |
| 3,078,362 | 2/63 | Steinert | 219—137 |
| 3,089,059 | 5/63 | Porterfield et al. | 315—243 |
| 3,098,149 | 7/63 | Kiyoski Inoue | 315—245 X |
| 3,098,174 | 7/63 | Inoue | 219—131 |

JOHN W. HUCKERT, *Primary Examiner.*

JAMES D. KALLAM, DAVID J. GALVIN, *Examiners.*